US012670890B1

(12) United States Patent
Anderson

(10) Patent No.: US 12,670,890 B1
(45) Date of Patent: Jun. 30, 2026

(54) SYSTEM FOR GENERATING AND IMPLEMENTING DIGITAL MUSIC TUNING FILES

(71) Applicant: Pandora's Anvil Multimedia, Inc., Phoenix, AZ (US)

(72) Inventor: Park Anderson, Phoenix, AZ (US)

(73) Assignee: Pandora's Anvil Multimedia, Inc., Phoenix, AZ (US)

( * ) Notice: Subject to any disclaimer, the term of this patent is extended or adjusted under 35 U.S.C. 154(b) by 12 days.

(21) Appl. No.: 18/752,523

(22) Filed: Jun. 24, 2024

Related U.S. Application Data

(63) Continuation of application No. 18/221,585, filed on Jul. 13, 2023, now Pat. No. 12,020,673, which is a continuation of application No. 18/084,129, filed on Dec. 19, 2022, now Pat. No. 11,727,906.

(60) Provisional application No. 63/291,915, filed on Dec. 20, 2021.

(51) Int. Cl.
*G10H 1/44* (2006.01)
*G10G 1/04* (2006.01)
*G10H 1/00* (2006.01)

(52) U.S. Cl.
CPC ................. *G10H 1/44* (2013.01); *G10G 1/04* (2013.01); *G10H 1/0008* (2013.01); *G10H 1/0066* (2013.01); *G10H 2210/066* (2013.01); *G10H 2210/081* (2013.01); *G10H 2210/086* (2013.01); *G10H 2210/471* (2013.01); *G10H 2210/565* (2013.01); *G10H 2240/161* (2013.01)

(58) Field of Classification Search
CPC ...... G10H 1/44; G10H 1/0008; G10H 1/0066; G10H 2210/066; G10H 2210/081; G10H 2210/086; G10H 2210/471; G10H 2210/565; G10H 2240/161; G10G 1/04
See application file for complete search history.

(56) References Cited

U.S. PATENT DOCUMENTS 5,501,130 A * 3/1996 Gannon ................... G10H 1/20
700/1
6,323,408 B1 * 11/2001 Liu .......................... G10H 1/44
84/451
(Continued)

OTHER PUBLICATIONS

"Microtuning and Alternative Intonation Systems," midi.org. https://www.midi.org/midi-articles/microtuning-and-alternative-intonation-systems [Date accessed: Jul. 29, 2021].

*Primary Examiner* — Jeffrey Donels
(74) *Attorney, Agent, or Firm* — Bold IP, PLLC; Houda El-Jarrah; Randy Fenton

(57) ABSTRACT

A system and method to generate and implement digital tuning files based on p-smooth number sequences for use with a digital musical instrument is provided. A p-smooth number sequence is generated and a subset of p-smooth numbers from the sequence is chosen as a musical octave of musical note frequencies. Each note within the octave is designated as a tonic, and each tonic is used to generate additional musical octaves and corresponding musical note notations. The musical octaves and corresponding musical note notations are stored into the digital memory of the digital musical instrument, and the instrument's native musical note mappings are remapped to the musical octaves and corresponding musical note notations from the digital file.

13 Claims, 9 Drawing Sheets

(56) References Cited

U.S. PATENT DOCUMENTS

| | | | | |
|---|---|---|---|---|
| 2003/0117400 | A1* | 6/2003 | Steinberg | G10H 1/0008 345/440 |
| 2005/0268774 | A1* | 12/2005 | Howarth | G09B 15/00 84/483.2 |
| 2008/0184872 | A1* | 8/2008 | Hunt | G10H 1/02 84/645 |
| 2021/0056941 | A1* | 2/2021 | Chang | G10H 1/0066 |
| 2022/0199058 | A1* | 6/2022 | Grant | G10H 1/26 |

* cited by examiner

SYSTEM FOR GENERATING AND IMPLEMENTING DIGITAL MUSIC TUNING FILES

CROSS-REFERENCE TO RELATED APPLICATIONS

This application is a Continuation application of U.S. Non-Provisional patent application Ser. No. 18/221,585 filed Jul. 13, 2023, which is a Continuation of U.S. Non-Provisional patent application Ser. No. 18/084,129 filed Dec. 19, 2022, now U.S. Pat. No. 11,727,906, which claims priority to and fully incorporates therein by reference for all purposes U.S. Provisional Application No. 63/291,915 filed Dec. 20, 2021, all of which are hereby fully incorporated herein by reference for all purposes.

FIELD OF THE INVENTION

This invention relates to musical systems, including a system for generating and implementing digital music tuning files.

BACKGROUND

As is known in the art, western music is based primarily on standard equal-tempered tuning (e.g., 12-TET tuning). However, it can be observed that these equally-tempered tuning systems all compromise the natural intervals that exist as physical properties of both sound and music.

Standard equal-tempered tuning also limits modern music to the same 12 tones per octave for each piece of music composed and played. In addition, the interval in between each of these 12 notes in standard western tuning is an irrational value of $$\sqrt[12]{2},$$

which only approximates the natural intervals, and only works when the octave is fixed at 12 notes.

As is also known in the art, western standard tuning has traditionally used the Rational-number frequency of 440 Hz as its generally-accepted standard reference pitch. However, when the Irrational, equally-tempered $$\sqrt[12]{2}$$

interval is applied to this Rational-number reference pitch (and then repeatedly applied to each resulting pitch), the 11 other calculated pitches in the octave all result as Irrational-number frequencies.

Accordingly, there is a need for a system and method for tuning musical instruments that does not compromise the natural musical intervals, and that does not also limit the number of available tones to 12.

There also is a need for a system and method for tuning musical instruments that is not based upon irrational numbers. Rather, what's needed is a tuning system that uses rational numbers for all frequencies and intervals. By calculating p-smooth integer sequences, and then transforming those sequences into playable octaves of musical frequencies, a system and method for generating and implementing digital tuning files based on rational numbers can be realized.

Accordingly, there is also a need for a system and method of generating and implementing digital tuning files based on p-smooth number sequences with digital musical instruments.

Because many contemporary digital music instruments are by default programmed to standard western equally-tempered tuning, there also is a need for a system and method of retuning digital musical instruments using digital tuning files.

SUMMARY

According to one aspect, one or more embodiments are provided below for a method of modifying an audio output of a digital musical instrument, the method comprises receiving information regarding the digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency, receiving a sequence of p-smooth numbers, choosing a subset of the sequence of p-smooth numbers and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, for each tonic, generating a corresponding second octave of third musical note frequencies, assigning each third musical note frequency within the second octave of third musical note frequencies a corresponding third musical note notation, storing into a digital file of the tuning file type each tonic, each second octave of third musical note frequencies corresponding to each tonic, and each third musical note notation corresponding to each third musical note frequency, loading the digital file into the digital musical instrument memory, and correlating, within the digital musical instrument memory, each first musical note notation within the digital musical instrument's first set of musical note notations with a corresponding third musical note notation and the third musical note frequency corresponding to the corresponding third musical note notation from the digital file.

In other embodiments, the choosing a subset of the sequence of p-smooth numbers further comprises choosing a first p-smooth number from the sequence of p-smooth numbers and designating the chosen first p-smooth number as a first lower frequency limit, doubling the first p-smooth number to determine a first upper frequency limit, choosing p-smooth numbers from the sequence of p-smooth numbers between the first lower frequency limit and the first upper frequency limit, and including the first lower frequency limit, the first upper frequency limit, and the chosen p-smooth numbers between the first lower frequency limit and the first upper frequency limit in (C)(3) in the first octave of second musical note frequencies.

In other embodiments, the choosing p-smooth numbers from the sequency further comprises octave multiplying and/or octave dividing any one of the p-smooth numbers in the sequence of p-smooth numbers between the first lower frequency limit and the first upper frequency limit.

In other embodiments, the generating a corresponding second octave of third musical note frequencies for each tonic further comprises designating each tonic as a second lower frequency limit of a respective octave, doubling each tonic to determine a second upper frequency limit of the respective octave, choosing p-smooth numbers between the second lower frequency limit and the second upper frequency limit, including the second lower frequency limit, the second upper frequency limit, and the chosen p-smooth numbers between the second lower frequency limit and the second upper frequency limit in the second octave of third musical note frequencies.

In other embodiments, the correlating within the digital musical instrument memory further comprises for each first musical note notation within the digital musical instrument's first set of musical note notations, identifying a corresponding first musical note frequency, for each second musical note notation corresponding to each first musical note notation, identify a corresponding second musical note frequency, determining a frequency difference between the corresponding first musical note frequency and the corresponding second musical note frequency, adding the frequency difference to the corresponding first musical note frequency and/or subtracting the frequency difference from the corresponding first musical note frequency to determine a mapped musical note frequency, and correlating, within the digital musical instrument's memory, each first musical note notation with each corresponding mapped musical note frequency.

In other embodiments, the sequence of p-smooth numbers includes at least one chosen from the group of 3-smooth, 5-smooth, 7-smooth, 11-smooth, 13-smooth, 17-smooth, and 19-smooth.

In other embodiments, the digital musical instrument includes a musical instrument digital interface (MIDI) instrument.

In other embodiments, the method further comprises generating chord diagrams, for the digital musical instrument, corresponding to at least some of the third musical note notations.

In other embodiments, the method further comprises generating fingering diagrams, for the digital musical instrument, corresponding to at least some of the third musical note notations.

In other embodiments, the correlating, within the digital musical instrument memory, each first musical note notation within the digital musical instrument's first set of musical note notations with a corresponding third musical note notation and the third musical note frequency corresponding to the corresponding third musical note notation from the digital file is triggered by a device including at least one of a foot pedal, a digital musical keyboard, a digital musical guitar, a digital musical interface, a computer, and a smartphone.

According to another aspect, one or more embodiments are provided below for a method of modifying an audio output of a digital musical instrument, the method comprises receiving information regarding the digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency, receiving a sequence of p-smooth numbers, choosing a subset of the sequence of p-smooth numbers including a first lower frequency limit, a first upper frequency limit equal to twice the first lower frequency limit, and a set of p-smooth numbers from the sequency of p-smooth numbers between the first lower frequency limit and the first upper frequency limit, and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, for each tonic, generating a corresponding second octave of third musical note frequencies, assigning each third musical note frequency within the second octave of third musical note frequencies a corresponding third musical note notation, storing into a digital file of the tuning file type each tonic, each second octave of third musical note frequencies corresponding to each tonic, and each third musical note notation corresponding to each third musical note frequency, loading the digital file into the digital musical instrument memory, and correlating, within the digital musical instrument memory, each first musical note notation within the digital musical instrument's first set of musical note notations with a corresponding third musical note notation and the third musical note frequency corresponding to the corresponding third musical note notation from the digital file.

According to another aspect, one or more embodiments are provided below for a method of modifying an audio output of a digital musical instrument, the method comprises receiving information regarding the digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency, receiving a sequence of p-smooth numbers, choosing a subset of the sequence of p-smooth numbers and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, for each tonic, generating a corresponding second octave of third musical note frequencies, assigning each third musical note frequency within the second octave of third musical note frequencies a corresponding third musical note notation, storing into a digital file of the tuning file type each tonic, each second octave of third musical note frequencies corresponding to each tonic, and each third musical note notation corresponding to each third musical note frequency, loading the digital file into the digital musical instrument memory, correlating, within the digital musical instrument memory, each first musical note notation within the digital musical instrument's first set of musical note notations with a corresponding third musical note notation and the third musical note frequency corresponding to the corresponding third musical note notation from the digital file using the steps comprising for each first musical note notation within the digital musical instrument's first set of musical note notations, identifying a corresponding first musical note frequency, for each second musical note notation corresponding to each first musical note notation, identifying a corresponding second musical note frequency, determining a frequency difference between the corresponding first musical note frequency and the corresponding second musical note frequency, adding the frequency difference to the corresponding first musical note frequency and/or subtracting the frequency difference from the corresponding first musical note frequency to determine a mapped musical note frequency, and correlating, within the digital musical instrument's memory, each first musical note notation with each corresponding mapped musical note frequency.

In other embodiments, the choosing p-smooth numbers from the sequence further comprises octave multiplying and/or octave dividing any one of the p-smooth numbers in the sequence of p-smooth numbers between the first lower frequency limit and the first upper frequency limit.

Other aspects and advantages of the invention will be apparent from the following description and the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

Figure 1:
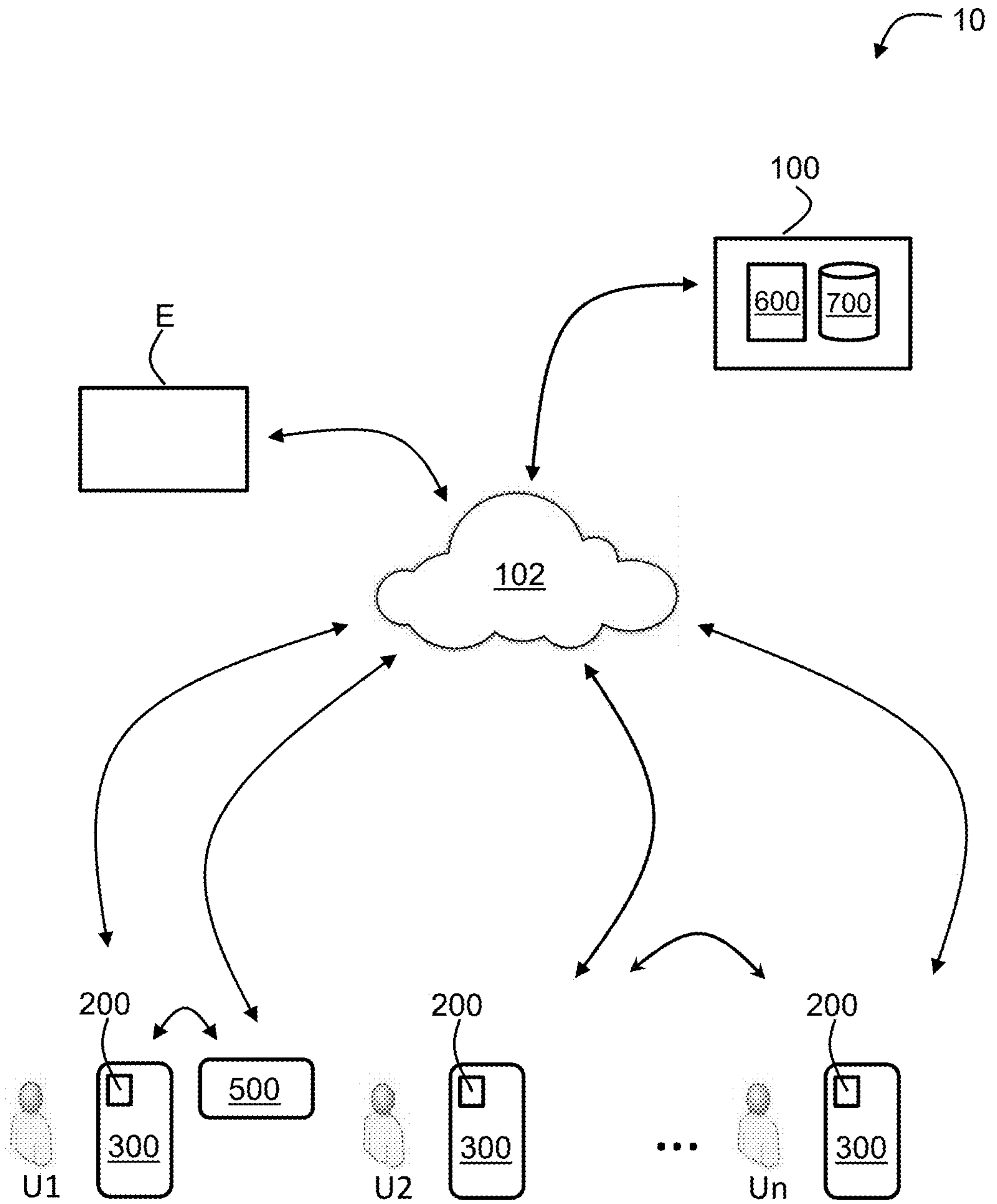
FIG. 1 shows an overview of a system for generating and implementing digital tuning files in accordance with exemplary embodiments hereof.

In general, the system according to exemplary embodiments hereof provides a system and method to generate and implement digital tuning files for use with a digital musical instrument. Specifically, the system described herein generates and implements digital tuning files for digital musical instruments based on p-smooth integer sequences. For example, the digital musical tuning files may be used to tune an electronic musical instrument (e.g., a synthesizer) to a non-factory setting of musical notes.

In another embodiment, the digital music tuning files may be incorporated directly into an electronic musical instrument and/or software (e.g., a synthesizer) as internal Frequency Table Arrays, rather than as external digital music tuning files.

In some embodiments, it may be preferable for the output of the system to be compatible with known technical standards that define communications protocols and digital interface requirements for digital musical instruments (e.g., with the musical instrument digital interface (MIDI)).

As is known in the art, music can be visually represented with symbols by using a Musical Notation system, as well as by using a Note-Naming Convention. For standard 12-TET tuning, the Western Notation System includes multiple staffs of 5 horizontal lines, and its Note-Naming Convention uses Alphabet letters and sharp/flat symbols (A, A #, B, C, etc.).

As a result, in some embodiments where the tunings need to be represented visually, a novel 7-line Musical Notation Staff and custom Note-Naming Convention have been implemented, to allow p-smooth tunings with more than 12 notes per octave to be displayed visually.

As is known in the art, a p-smooth number is an integer whose largest prime factor is less than or equal to P. For example, the following integers are 5-smooth numbers since all of these numbers include prime factors that are less than or equal to 5: 1, 2, 4, 5, 6, 8, 9, 10, 12, 15, 16, 18, 20, 24, 25, . . . .

In some embodiments, the application generates the instrument-specific Fingerings, Chord Diagrams and Mappings that musicians will require in order to play a selected p-smooth tuning on their instrument of choice.

In some embodiments, a MIDI File, generated by calls to an external Artificial Intelligence Music Generator API, is mapped by the application to a selected p-smooth tuning, and then output as a unique retuned MIDI composition.

In some embodiments, after the application generates a MIDI file composition retuned to a selected p-smooth tuning, the file is converted to an Audio file (.wav, .mp3, etc.) and then used to generate an NFT (Non-Fungible Token), or other digital token, by automatic submission to an external NFT API (e.g., a blockchain-based timestamping (TSS) API).

In some embodiments, a selected p-smooth tuning is mapped by the application from audible p-smooth frequencies to equivalent p-smooth frequencies in the visible and near-visible electromagnetic color spectrum. This is accomplished by taking an audible p-smooth octave of audio frequencies in Hz between 420 Hz and 870 Hz, and then converting the Hz to THz, in the range of 420 THz to 870 THz, which encompasses the electromagnetic spectrum between Infrared light and Ultraviolet light.

For example, an electromagnetic p-smooth octave of light-frequencies are output by the application to tunable lasers, which then emit laser beams that are the colors of the corresponding audible musical frequencies. As a specific example, an audible frequency of 576 Hz, which is a D note, is mapped to 576 THz, which is the color green.

In some embodiments, instead of generating tuning files, the application instead generates the specifications required to build a non-digital instrument that will play p-smooth tunings. For example, the application generates the hole size and placement required to build a native-American flute that will play a specific p-smooth tuning.

Figure 7:
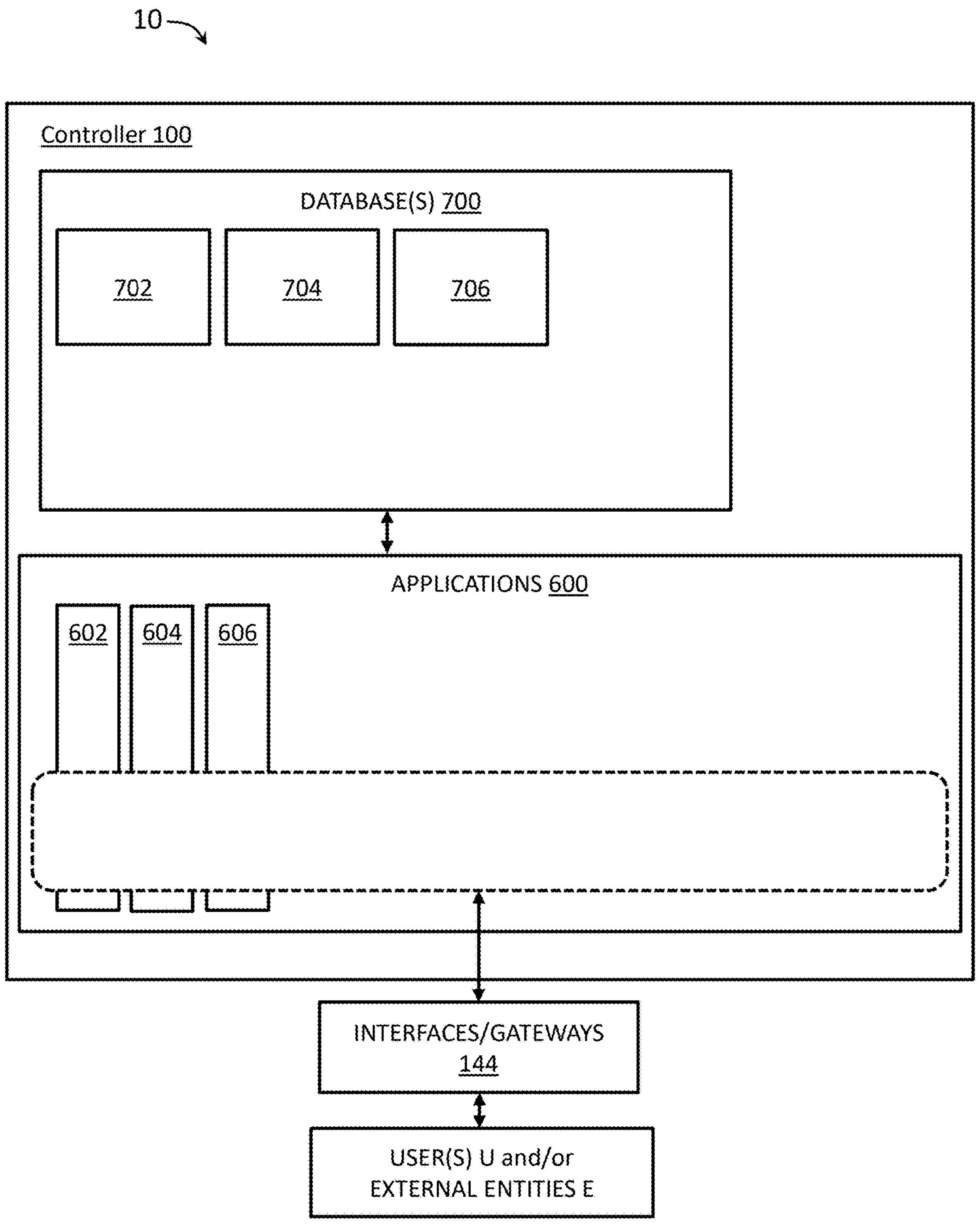
FIG. 7 shows aspects of a computing environment of the system of FIG. 1 in accordance with exemplary embodiments hereof.

FIG. 1 shows an overview of an exemplary framework for a system 10 for generating and implementing digital musical tuning files (also referred to herein as simply the system 10) according to exemplary embodiments hereof. As shown, the system 10 may include a local and/or backend controller 100 that may interface with users U of the system 10 (individually and/or collectively) via one or more application interfaces 200 (e.g., a software application, a mobile application or "app", a browser, website or Internet interface, or other types of applications) running on one or more computing devices 300 (e.g., digital musical instruments, smart phones, tablet computers, laptops, desktop computers, mobile media players, etc., and any combinations thereof). In some embodiments, the computing devices 300 may include a digital musical instrument in combination with a computer or other type of device. The system 10 also may include musical hardware 500 as well as other systems, elements and components as required by the system 10 to fulfill its functionalities. In some embodiments, the system 10 also interacts with third-party entities E and/or applications as shown in FIG. 7.

The local and/or backend system 100 includes one or more computers and/or servers 104 including one or more software systems 106, one or more applications 600, and one or more databases 700. The one or more software systems 106 may include operating systems, system software, web server software, social networking software, communication software, software applications, scripts, firmware, other types of software systems and any combinations thereof. The applications 600 and databases 700 will be described in other sections.

The computing devices 300 (e.g., the digital musical instruments, computers, etc.) and the local and/or backend controller 100 may preferably be connected to one or more networks 102 (e.g., the Internet, LAN, WAN, wireless communication systems, cellular communication systems, telephony or other types of communication systems or protocols) and may communicate thereby. In other embodiments, the computing devices 300 and the local and/or backend system 100 may simply communicate via one or more wired connections (e.g., USB cables).

In some embodiments, the local and/or backend controller 100 may include a cloud platform (e.g., one or more backend servers), one or more local controllers, or any combination thereof. In some embodiments, the local and/or backend controller 100 includes a cloud platform that interfaces with one or more local controllers. For example, administrators of the system 10 may interface with the system 10 via a local controller in communication to a cloud platform.

In some embodiments, the application 200 provides a graphical user interface (GUI) that enables a user U to interface with the application 200, the local controller and/or backend 100, and the overall system 10. The application 200 may generally provide an interface with which the user U may enter information for the system 10 to utilize (e.g., upload to the backend 100), and interface controls (e.g., touchscreen buttons, etc.) for a user U to activate while interacting with the system 10. The application 200 also may display data and other types of information that a user U may read or otherwise consume and/or provide to other users U. In general, and in some embodiments, the application 200 may provide a primary interface with which a user U may interact with the system 10.

Figure 2:
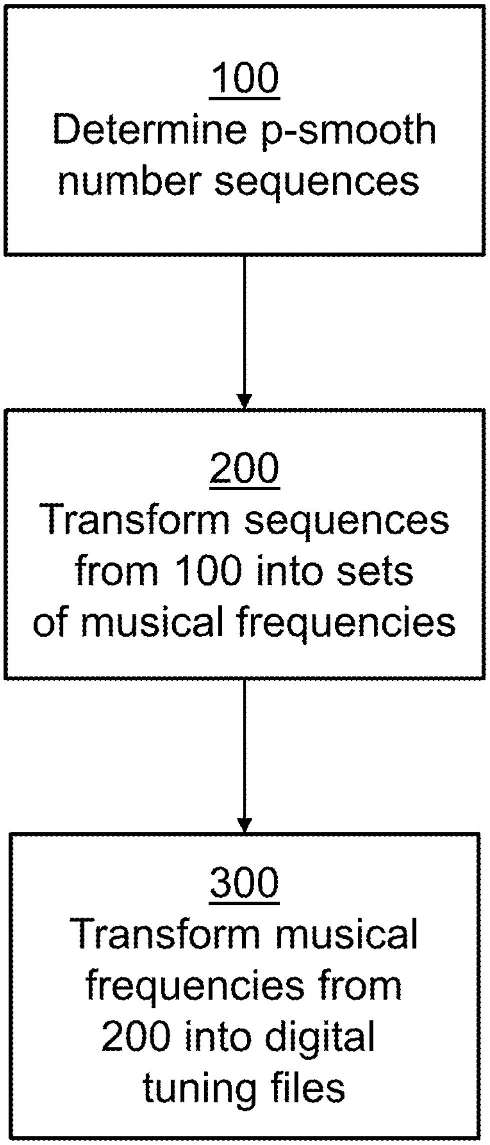
FIG. 2 shows example workflow actions taken by the system of FIG. 1 in accordance with exemplary embodiments hereof.

In some embodiments as shown in FIG. 2, tuning files for digital musical instruments are generated and implemented by the system 10 in an overall three-step process. In the first step (at 100), one or more p-smooth number sequences are determined. Next, in a second step (at 200), at least some of the p-smooth number sequences calculated in 100 are next transformed into individual sets of musical frequencies, each set with matching musical notations. Then, in a third step (at 300), at least some of the sets of musical frequencies and matching musical notations created in 200 are used to build and generate tuning files formatted for compatibility with a respective digital musical instrument. Each tuning file is then used to tune, map, and generally re-correlate the instrument's native musical notation to output frequency mapping within the digital memory of the digital musical instrument to the newly generated musical notation to output frequency correlation of the newly generated tuning files.

Figure 3:
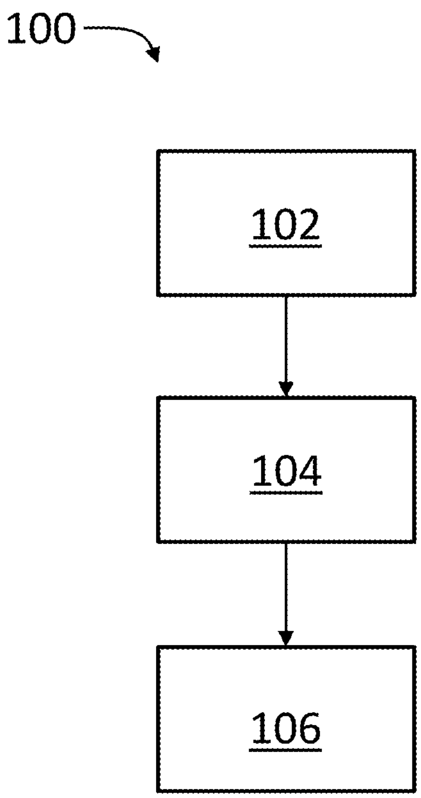
FIG. 3 shows example workflow actions taken by the system of FIG. 1 in accordance with exemplary embodiments hereof.

FIG. 3 refers to steps 100 that may be taken by the system 10 to determine one or more p-smooth number sequences to complete step 100 of FIG. 1. In one embodiment as shown in FIG. 2, the values of p for calculating one or more p-smooth number sequences are determined (at 102). In one example, these values may include p=3, 5, 7, 9, 11, 13, 17, and 19. However, it is understood that any applicable prime value(s) for p may be used. Next (at 104), a sequence of positive integers of for each value of p is calculated. In some embodiments, the quantity of positive integers of each sequence is preferably about 10,000, but it is understood that other quantities also may be determined and utilized. Then (at 106), each sequence determined in 104 is stored into a unique array of data.

Figure 4:
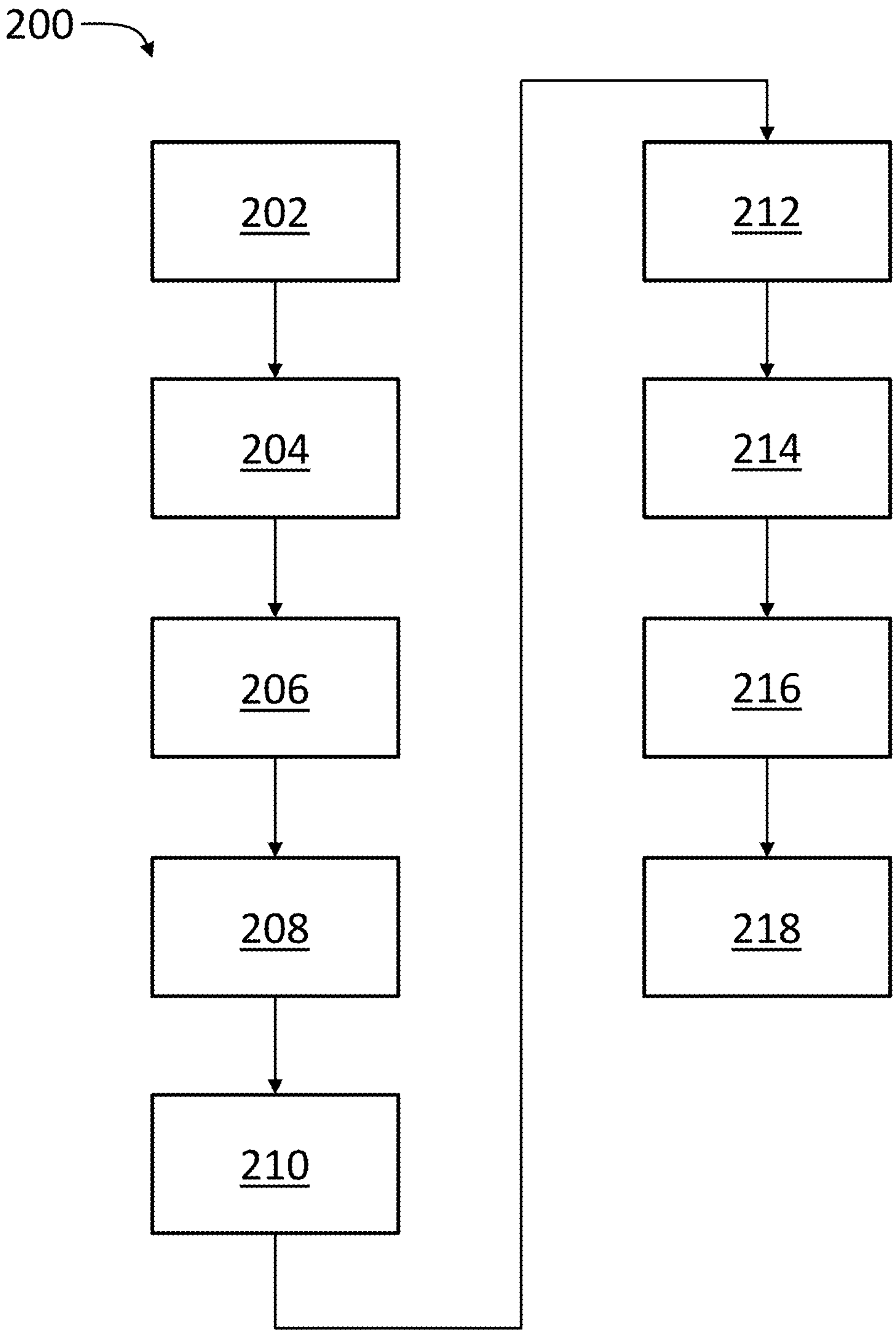
FIG. 4 shows example workflow actions taken by the system of FIG. 1 in accordance with exemplary embodiments hereof.

FIG. 4 refers to steps 200 that may be taken by the system 10 to transform at least some of the p-smooth number sequences determined and stored in 100 into musical frequencies, each with matching musical notations, to complete step 200 of FIG. 1. First (at 202), a "seed value" is determined for each p-smooth number sequence of interest. The seed value will represent the lower frequency of an octave associated with the particular p-smooth number sequence. Next (at 204), the seed value is doubled (2×) to determine the upper frequency of the respective octave associated with the seed value and of the particular sequence.

Then (at 206), for each p-smooth number sequence with seed values and upper frequency limits determined, the set of integers between and including the seed value and the upper frequency (2× the seed value) are stored into new arrays (e.g., "phase 1 octave arrays"). Accordingly, each phase 1 octave array will include all of the p-smooth numbers between (and including) its seed value and its upper frequency value for its particular p-smooth number.

Next (at 208), for each phase 1 octave array, a subset of numbers included in each phase 1 octave array is chosen and arranged into individual sets of tonics (e.g., "core tonics"). The core tonics within each subset of each octave array are chosen using the following guidelines:

1. Only rational numbers (numbers that can be represented as a fraction) are to be chosen.
2. Natural numbers are preferred (e.g., "counting numbers").
3. When two numbers within the octave array are close to one another, only one of the numbers is chosen to be included in a subset of core tonics.
4. Each subset of core tonics is preferably symmetrical, with mirror hi/lo frequencies at the center two so-called musical "Tri-Tones", and mirror frequencies sweeping down and up from the two centers until reaching A 1:1 and A2:1 at the octave.
5. The process may include "octave doubling", "octave tripling", etc. (i.e., octave multiplying), to determine a note. Additionally, the process may include "octave dividing" in a similar manner.

Additional playable notes outside the core tonics also may be determined (at 210). For example, the guidelines shown above may be applied to p-smooth numbers within each original p-smooth number sequence above the upper frequency (2× the seed value) and then "octave dividing" down may be applied to determine additional playable notes. Next (at 212), each set of core tonics and its respective additional playable notes are combined into a new array (e.g., "tonic sets").

Then (at 214), for each tonic set, each element within the tonic set is matched with its musical notation (e.g., F #, G, G #, etc.) and stored into a new array as tonic notes in the same order as the tonic sets.

Next (at 216), each tonic note is used to generate a new scale of playable notes for the respective tonic note, and each new scale is saved into new arrays (e.g., "phase 2 octave arrays) at 218. In some embodiments, this includes assigning each tonic note as the lower frequency of its respective new scale, doubling the tonic (2×) to determine the upper frequency of the new scale, and then determining the p-smooth integers between the lower and upper frequencies to complete each octave. Given this, it is understood that the details regarding determining the lower frequency value(s), upper frequency value(s), and the integers between the lower and upper frequency value(s) as described in other sections in relation to generating the phase 1 octave arrays also pertain to this step.

Figure 5:
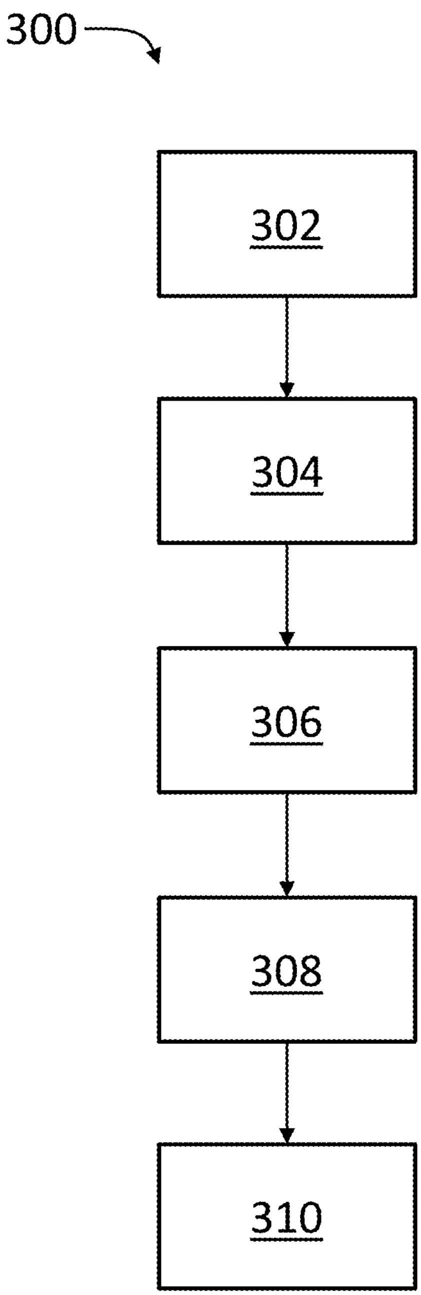
FIG. 5 shows example workflow actions taken by the system of FIG. 1 in accordance with exemplary embodiments hereof.

FIG. 5 refers to steps 300 that may be taken by the system 10 to complete step 300 of FIG. 1. These actions may include, without limitation, using the musical frequencies and matching musical notations determined in 200 to build, generate, and implement the digital files into the digital musical instrument.

First (at 302), additional user-provided information provided by a user U regarding the transformation of the musical frequencies into digital tuning files is collected. In some embodiments, this user-provided information may include at least some of the following: (i) the phase 2 octave array(s) generated in 200 that are of interest, (ii) the tonic sub-selection (optional) (e.g., sub-selections that are slight variations to the primary array of tonics), (iii) the user's preferred selective octave to start with (optional), (iv) the user's preferred number of playable notes (optional), (v) the type of digital instrument that the resulting tuning file(s) will be used to tune (this will determine the file format type of the resulting tuning file(s)), and (vi) any other required user-provided information.

Next (at 304), playable frequencies for each phase 2 octave array generated in 200 and identified in 302 are generated and mapped (at 306) to matching arrays of musical note notations (e.g., 600/D #).

Then (at 306), a unique tuning file for each tonic is generated in the file format compatible with the user's selected type of digital musical instrument provided by the user in 302. Each tuning file is then stored (loaded) in the proper folder location (at 308) (e.g., within the digital musical instrument or an associated controller) so that it may be implemented into a selected digital musical instrument.

Then (at 310), using the tuning files, the digital musical instrument is tuned and/or retuned to the desired musical note notation to output frequency correlation provided in the files.

Figure 6:
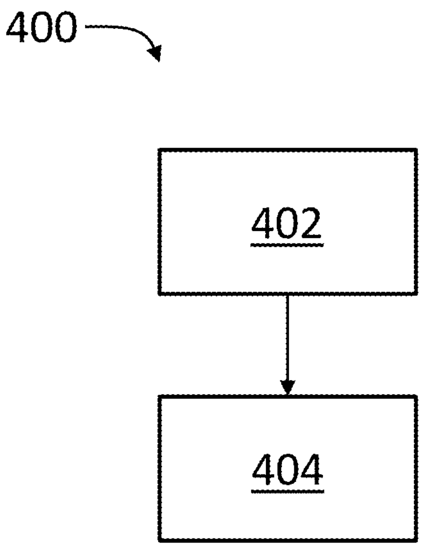
FIG. 6 shows example workflow actions taken by the system of FIG. 1 in accordance with exemplary embodiments hereof.

FIG. 6 shows details 400 regarding the mapping and/or retuning process that takes place in 306. First (at 402), each desired playable frequency generated in 302 and its corresponding musical note notation is compared with a playable frequency normally triggered by activating a particular playing mechanism (e.g., a particular musical key (or combination of musical keys) on a keyboard) on the digital musical instrument for the same musical note. The difference between each newly generated playable frequency and each corresponding normally triggered playable frequency for each musical note notation is thereby determined.

Then (at 404), once this difference in frequency has been determined, each newly generated playable frequency and its musical note notation is mapped to the corresponding native musical note notation in the memory of the digital musical instrument (e.g., to the digital instrument's note number for the respective musical note notation) by adding and/or subtracting the difference in frequency to the normally triggered frequency.

Once the above process has been completed, the user U may use his/her digital musical instrument to play the p-smooth number sequences as electronic music.

It is understood that the descriptions of steps provided above is meant for demonstration and that other steps also may be performed. It also is understood that not all of the steps must necessarily be performed, and that the steps may be performed in different order.

System Structure

FIG. 7 shows aspects of an exemplary system 10 of FIG. 1. As shown, the system 10 and the local and/or backend system 100 comprises various internal applications 600 and one or more databases 700, described in greater detail below. The internal applications 600 may generally interact with the one or more databases 700 and the data stored therein.

The database(s) 700 including databases 702, 704, and 706 may comprise one or more separate or integrated databases, at least some of which may be distributed. The database(s) 700 may be implemented in any manner, and, when made up of more than one database, the various databases need not all be implemented in the same way. It should be appreciated that the system is not limited by the nature or location of database(s) 700 or by the manner in which they are implemented.

Each of the internal applications 600 may provide one or more services via an appropriate interface. Although shown as separate applications 600 for the sake of this description, it is appreciated that some or all of the various applications 600 may be combined. The various applications 600 may be implemented in any manner and need not all be implemented in the same way (e.g., using the same software languages, interfaces or protocols).

In some embodiments, the applications 600 may include one or more of the following applications 600:

1. P-smooth number sequence generation application(s) 602. This application(s) performs the operations 100 described above.
2. Musical frequencies transformation application(s) 604. This application(s) performs the operations 200 described above.
3. Tuning files generation application(s) 606. This application(s) performs the operations 300 described above.

The applications 600 also may include other applications and/or auxiliary applications (not shown). Those of ordinary skill in the art will appreciate and understand, upon reading this description, that the above list of applications is meant for demonstration and that the system 10 may include other applications that may be necessary for the system 10 to generally perform its functionalities as described in this specification. In addition, as should be appreciated, embodiments or implementations of the system 10 need not include all of the applications listed, and that some or all of the applications may be optional. It also is understood that the scope of the system 10 is not limited in any way by the applications that it may include.

In some embodiments, the database(s) 700 may include one or more of the following databases:

1. P-smooth number sequences database(s) 702. This database may store any data and/or other types of information related to operations 100 described above.
2. Musical frequencies database(s) 704. This database may store any data and/or other types of information related to operations 200 described above.
3. Tuning files database(s) 706. This database may store any data and/or other types of information related to operations 300 described above.

It is understood that the above list of databases is meant for demonstration and that the system 10 may include some or all of the databases, and also may include additional databases as required. It also is understood that the scope of the system 10 is not limited in any way by the databases that it may include.

Various applications 600 and databases 700 in the system 10 may be accessible via interface(s) 142. These interfaces 144 may be provided in the form of APIs or the like and made accessible to users U via one or more gateways and interfaces 144 (e.g., via a web-based application 200 and/or a mobile application 200 running on a user's device 300). In some embodiments, the system 10 may be interacting with External 3rd Party Applications E via RESTful API calls, rather than interacting with users.

Figure 8:
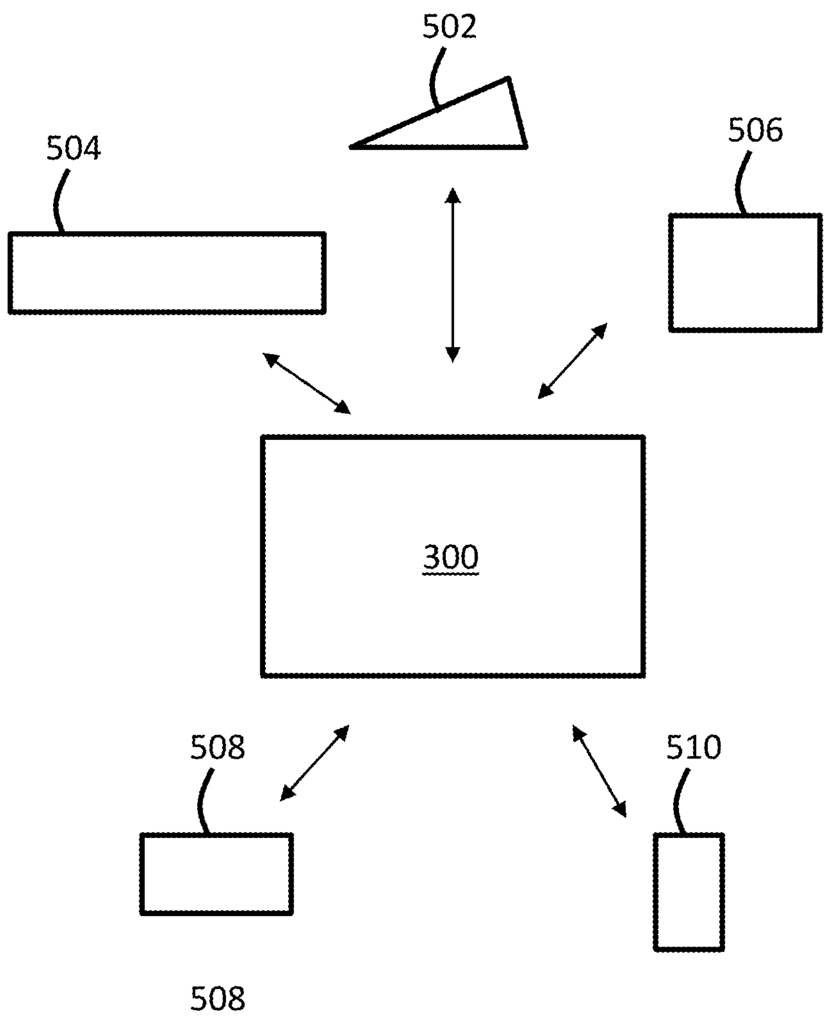
FIG. 8 shows aspects of additional hardware included in the system of FIG. 1 in accordance with exemplary embodiments hereof.
Figure 9:
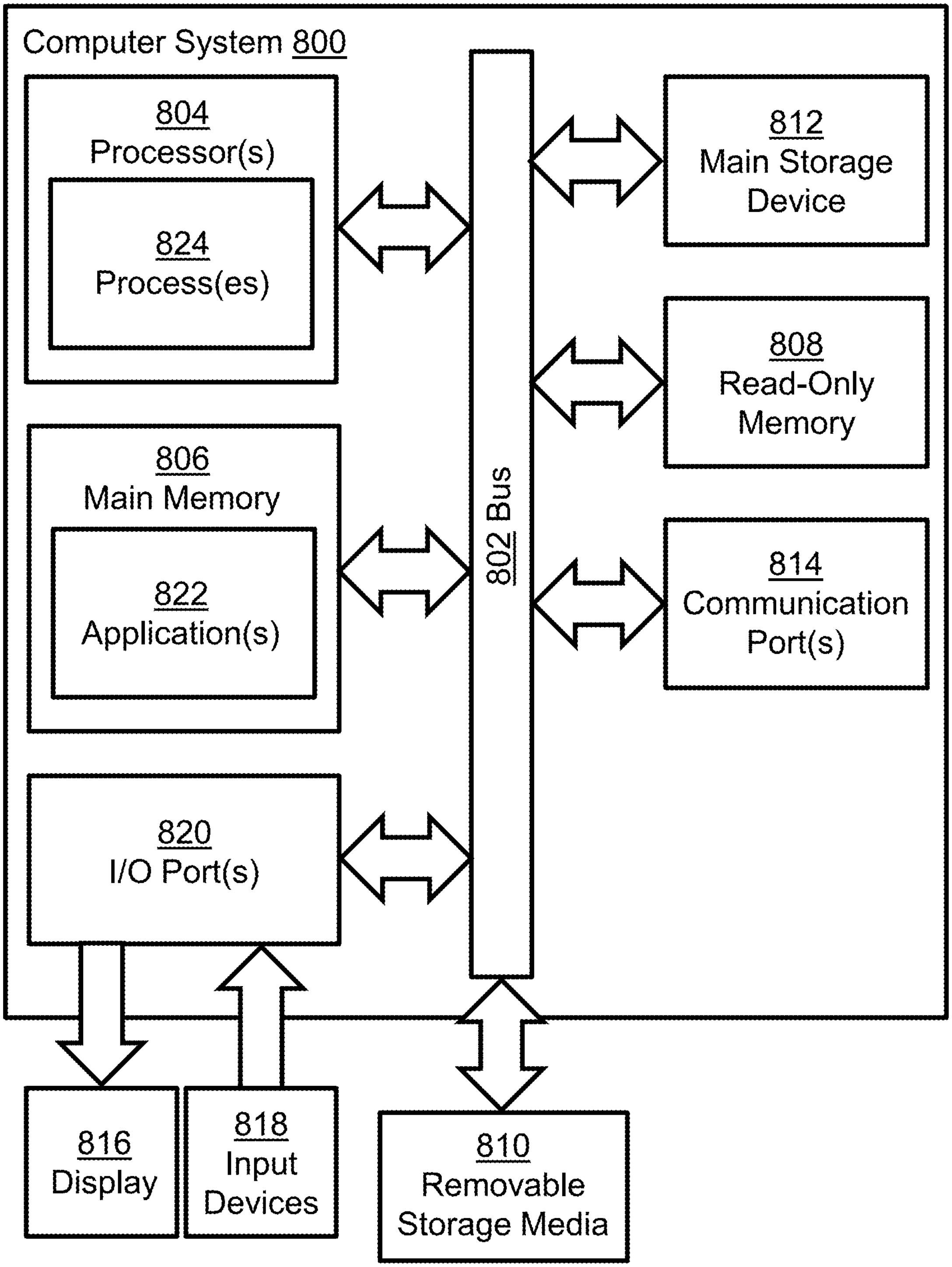
FIG. 9 depicts aspects of computing and computer devices in accordance with exemplary embodiments hereof.

In some embodiments as shown in FIG. 8, the system 10 also includes musical hardware 500 that may implement the retuning(s) of the digital musical instruments 300 using the generated tuning files in real time. For example, the hardware 500 may include a foot pedal 502 that implements the retuning of a MIDI keyboard, a MIDI guitar 504, an additional MIDI interface 506, a computer 508, a smartphone 510, other types of devices, and any combinations thereof.

It is understood that any steps described above are meant for demonstration and that additional steps may be performed, not all of the described steps may be performed, and the steps may be taken in different orders. It also is understood that the scope of the assembly 10 is not limited in any way by the steps taken during its use.

It also is understood that any aspect and/or element of any embodiment of the system 10 described herein or otherwise may be combined with any other aspect and/or element of any other embodiment described herein or otherwise in any way to form additional embodiments of the system 10 all of which are within the scope of the system 10.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

FIG. 11 is a schematic diagram of a computer system 800 upon which embodiments of the present disclosure may be implemented and carried out.

According to the present example, the computer system 800 includes a bus 802 (i.e., interconnect), one or more processors 804, one or more communications ports 814, a main memory 810, removable storage media 810, read-only memory 808, and a mass storage 812. Communication port(s) 814 may be connected to one or more networks by way of which the computer system 800 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 804 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 814 can be any of an RS-232 port for use with a modem-based dial-up connection, a 10/100 Ethernet port, a Gigabit port using copper or fiber, or a USB port, and the like. Communications port(s) 814 may be chosen depending on a network such as a Local Area Network (LAN), a Wide Area Network (WAN), a CDN, or any network to which the computer system 800 connects. The computer system 800 may be in communication with peripheral devices (e.g., display screen 810, input device(s) 818) via Input/Output (I/O) port 820. Some or all of the peripheral devices may be integrated into the computer system 800, and the input device(s) 818 may be integrated into the display screen 810 (e.g., in the case of a touch screen).

Main memory 810 can be Random Access Memory (RAM), or any other dynamic storage device(s) commonly known in the art. Read-only memory 1608 can be any static storage device(s) such as Programmable Read-Only Memory (PROM) chips for storing static information such as instructions for processor(s) 804. Mass storage 812 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 802 communicatively couples processor(s) 804 with the other memory, storage and communications blocks. Bus 802 can be a PCI/PCI-X, SCSI, a Universal Serial Bus (USB) based system bus (or other) depending on the storage devices used, and the like. Removable storage media 810 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 810 is encoded with application(s) 822 that support(s) the functionality as discussed herein (an application 822 may be an application that provides some or all of the functionality of one or more of the mechanisms described herein). Application(s) 822 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 804 accesses main memory 810 via the use of bus 802 in order to launch, run, execute, interpret, or otherwise perform the logic instructions of the application(s) 822. Execution of application(s) 822 produces processing functionality of the service(s) or mechanism(s) related to the application(s). In other words, the process(es) 824 represents one or more portions of the application(s) 822 performing within or upon the processor(s) 804 in the computer system 800.

It should be noted that, in addition to the process(es) 824 that carries(carry) out operations as discussed herein, other embodiments herein include the application 822 itself (i.e., the un-executed or non-performing logic instructions and/or data). The application 822 may be stored on a computer readable medium (e.g., a repository) such as a disk or in an optical medium. According to other embodiments, the application 822 can also be stored in a memory type system such as in firmware, read only memory (ROM), or, as in this example, as executable code within the main memory 810 (e.g., within Random Access Memory or RAM). For example, application 822 may also be stored in removable storage media 810, read-only memory 808, and/or mass storage device 812.

Those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method comprising:

(A) receiving information regarding a digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency;

(B) loading a first digital file into the digital musical instrument memory;

(C) correlating, within the digital musical instrument memory, each first musical note notation within the digital musical instrument's first set of musical note notations with a corresponding third musical note notation and a third musical note frequency corresponding to the corresponding third musical note notation from the first digital file; and (D) outputting a visual representation of each of the corresponding third musical note notations, the visual representation including at least one musical staff with seven staff lines and six staff spaces;

wherein the corresponding third musical note notation and the third musical note frequency corresponding to the corresponding third musical note notation are determined by choosing a subset of a sequence of p-smooth numbers and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, and, for each tonic, generating a corresponding second octave of the third musical note frequencies, and assigning each third musical note frequency within the second octave of third musical note frequencies the corresponding third musical note notation.

2. The method of claim 1 wherein each staff line and each staff space within the musical staff represents a musical frequency.

3. The method of claim 1 wherein the visual representation of the at least one musical staff includes a three-dimensional representation of a first at least one musical staff and a second at least one musical staff.

4. The method of claim 3 wherein the first at least one musical staff and the second at least one musical staff are aligned along an axis in the three-dimensional representation.

5. A method comprising:

(A) receiving information regarding a digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency;

(B) loading a first digital file into the digital musical instrument memory;

(C) correlating, within the digital musical instrument memory, each first musical note notation within the digital musical instrument's first set of musical note notations with a corresponding third musical note notation and a third musical note frequency corresponding to the corresponding third musical note notation from the first digital file; and (D) mapping each third musical note frequency to a corresponding visible or near-visible electromagnetic color spectrum frequency;

wherein the corresponding third musical note notation and the third musical note frequency corresponding to the corresponding third musical note notation are determined by choosing a subset of a sequence of p-smooth numbers and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, and, for each tonic, generating a corresponding second octave of the third musical note frequencies, and assigning each third musical note frequency within the second octave of third musical note frequencies the corresponding third musical note notation.

6. The method of claim 5 further comprising storing, into a second digital file, each electromagnetic color spectrum frequency with a corresponding electromagnetic spectrum frequency notation.

7. The method of claim 6 further comprising, emitting, using a light emitting device and the second digital file, light at a frequency that corresponds to at least one of the electromagnetic color spectrum frequencies.

8. The method of claim 5 wherein the mapping includes multiplying each third musical note frequency by $1\times10^{12}$.

9. A method comprising:

(A) receiving information regarding a digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency;

(B) loading a first digital file into the digital musical instrument memory;

(C) correlating, within the digital musical instrument memory, each first musical note notation within the digital musical instrument's first set of musical note notations with a corresponding third musical note notation and a third musical note frequency corresponding to the corresponding third musical note notation from the first digital file; and (D) generating at least one design specification of a non-digital musical instrument wherein the at least one design specification, when implemented, results in the non-digital musical instrument having an ability to emit a third musical note frequency when a corresponding third musical note notation is played using the non-digital instrument;

wherein the corresponding third musical note notation and the third musical note frequency corresponding to the corresponding third musical note notation are determined by choosing a subset of a sequence of p-smooth numbers and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, and, for each tonic, generating a corresponding second octave of the third musical note frequencies, and assigning each third musical note frequency within the second octave of third musical note frequencies the corresponding third musical note notation.

10. The method of claim 9 wherein the non-digital musical instrument includes a flute.

11. The method of claim 10 wherein the at least one design specification includes a hole size and/or a hole placement.

12. A method comprising:

(A) receiving information regarding a digital musical instrument, the information including a tuning file type used by the digital musical instrument, and wherein the digital musical instrument includes memory storing a first set of first musical note notations with each first musical note notation within the first set of first musical note notations correlated to a corresponding first musical note frequency;

(B) loading a first digital file into the digital musical instrument memory;

(C) correlating, within the digital musical instrument memory, each first musical note notation within the digital musical instrument's first set of musical note notations with a corresponding third musical note notation and a third musical note frequency corresponding to the corresponding third musical note notation from the first digital file; and (D) configuring at least one device with the digital musical instrument wherein the at least one device causes an audio output of at least one third musical note frequency when at least one first musical note notation correlated to the at least one third musical note frequency is activated;

wherein the corresponding third musical note notation and the third musical note frequency corresponding to the corresponding third musical note notation are determined by choosing a subset of a sequence of p-smooth numbers and assigning the subset as a first octave of second musical note frequencies, assigning each second musical note frequency within the first octave of second musical note frequencies a corresponding second musical note notation, assigning each second musical frequency and its corresponding second musical note notation within the octave of second musical note frequencies as a unique tonic, and, for each tonic, generating a corresponding second octave of the third musical note frequencies, and assigning each third musical note frequency within the second octave of third musical note frequencies the corresponding third musical note notation.

13. The method of claim 12 wherein the at least one device includes at least one of a foot pedal, a MIDI guitar, an additional MIDI interface, a computer, and a smartphone.

* * * * *